(12) United States Patent
Imamura et al.

(10) Patent No.: US 7,431,372 B2
(45) Date of Patent: Oct. 7, 2008

(54) VEHICLE SEAT

(75) Inventors: Masahiro Imamura, Utsunomiya (JP); Yoshinobu Terada, Utsunomiya (JP); Toshio Yamada, Utsunomiya (JP); Kazuo Sunaoshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/939,898

(22) Filed: Nov. 14, 2007

(65) Prior Publication Data
US 2008/0111391 A1  May 15, 2008

(30) Foreign Application Priority Data
Nov. 15, 2006  (JP) .............. 2006-309166

(51) Int. Cl.
*B60N 2/30* (2006.01)
*B60N 2/12* (2006.01)

(52) U.S. Cl. .............. 296/65.09; 296/65.13; 296/65.16; 297/15

(58) Field of Classification Search .................. 296/63, 296/65.01, 65.05, 65.09, 65.13, 65.14, 65.16, 296/68.1; 297/15, 326
See application file for complete search history.

(56) References Cited

U.S. PATENT DOCUMENTS

| | | | | |
|---|---|---|---|---|
| 3,202,453 A | * | 8/1965 | Richards | 296/66 |
| 5,269,581 A | * | 12/1993 | Odagaki et al. | 296/66 |
| 5,868,451 A | * | 2/1999 | Uno et al. | 296/66 |
| 5,890,758 A | | 4/1999 | Pone et al. | |
| 5,975,612 A | * | 11/1999 | Macey et al. | 296/66 |
| 5,979,964 A | * | 11/1999 | Ban et al. | 296/66 |
| 6,820,913 B2 | * | 11/2004 | Macey et al. | 296/65.13 |
| 2002/0047287 A1 | * | 4/2002 | Kawasaki | 296/64 |
| 2004/0100115 A1 | * | 5/2004 | Rhodes et al. | 296/65.09 |

FOREIGN PATENT DOCUMENTS

JP  10-119613  5/1998

* cited by examiner

*Primary Examiner*—D. Glenn Dayoan
*Assistant Examiner*—Paul A Chenevert
(74) *Attorney, Agent, or Firm*—Rankin, Hill & Clark LLP

(57) ABSTRACT

A vehicle seat includes: a seat cushion; and a front end transfer member which supports a front end of the seat cushion movably in a front-rear direction of a vehicle; and a rear end transfer member which supports a rear end of the seat cushion movably in a front-rear direction of the vehicle; wherein the seat cushion is storable in a storage concave part provided in a vehicle floor further to a rear than the seat cushion, and the front end transfer member is provided on a vehicle floor adjacent to the front of the storage concave part, and the rear end transfer member is provided on a vehicle floor adjacent to a side of the storage concave part, or provided on a side interior surface of the storage concave part.

10 Claims, 7 Drawing Sheets

VEHICLE SEAT

BACKGROUND OF THE INVENTION

1. Field of the Invention

The present invention relates to a vehicle seat. Specifically, the present invention relates to a vehicle seat in which the seat can be stored in the storage concave part provided in the vehicle floor further to the back than the seat.

Priority is claimed on Japanese Patent Application No. 2006-309166, filed Nov. 15, 2006, the content of which is incorporated herein by reference.

2. Description of Related Art

Technology exists that relates to a vehicle seat that is provided with a concave part under the floor panel further to the back than the seat, wherein the seat is stored in the concave part. This technology is disclosed, for example, in Japanese Unexamined Patent Application, First Publication, No. H10-119613.

Moreover, another technology exists in which a seat is slidably supported on a seat rail provided along the inside of a rear wheel housing, and the seat is constituted so that the seat can be stored in the concave part provided in the vehicle floor further to the back than the seat. This technology is disclosed, for example, in U.S. Pat. No. 5,890,758.

However, in the former technology, since the seat is supported on the inner part of the wheel housing by the bracket extension part, there is a problem in that the seat width is limited by the size of the bracket extension part.

On the other hand, in the latter technology, since the slide rail that slides the seat in the front-rear direction is provided on the inside of the wheel housing, there is a problem in that the seat width is limited by the size of the slide rail.

An object of the present invention is to provide a vehicle seat in which the seat can be stored in a storage area while maintaining sufficient width of the seat.

SUMMARY OF THE INVENTION

To achieve the above-described object, the present invention provides a vehicle seat including: a seat cushion; a front end transfer member which supports a front end of the seat cushion movably in a front-rear direction of a vehicle; and a rear end transfer member which supports a rear end of the seat cushion movably in a front-rear direction of the vehicle; wherein the seat cushion is storable in a storage concave part provided in a vehicle floor further to a rear than the seat cushion, and the front end transfer member is provided to the front of the storage concave part, and the rear end transfer member is provided to a side of the storage concave part.

According to the above constitution, since the rear end transfer member and the front end transfer member can be provided while avoiding the storage concave part, the seat width can be widened, for example, so that the seat sides are adjacent to the interior surfaces of the rear wheel housings. The seat can be moved to above the storage concave part.

Therefore, a wide variety of seat arrangements is possible, and the front space of the seat can be made wider.

The vehicle seat of the present invention may further include a supporting member that connects a rear end of the seat cushion and the rear end transfer member.

According to the present invention, since the seat can be moved forward so that the rear end of the seat is positioned further to the front of the storage concave part, there is an advantageous effect that sufficient rear space can be used for general storage purposes, when the seat is not stored.

The vehicle seat of the present invention may further provide the rear end transfer member on the floor surface located behind the wheel housing.

According to the above constitution, the seat width can be widened, so that the seat sides are adjacent to the interior surfaces of the wheel housings, and the seat can be supported by the wide supporting. Therefore, the seat can be stably supported.

In the vehicle seat of the present invention, the front end transfer member and the rear end transfer member may include a front slide rail and a rear slide rail, respectively, which both extend in a front-rear direction of the vehicle. The front slide rail and the rear slide rail may be parallel to each other.

According to the above constitution, the vehicle seat can be slidably supported with respect to the vehicle floor in the front-rear direction.

In the vehicle seat of the present invention, the front slide rail may be provided closer to a vehicle center in a vehicle width direction than the rear slide rail.

According to the above constitution, since the rear end of the seat can be supported by the wider rear slide rail, and the front end of the seat can be supported by the narrower front slide rail, the seat can be stably supported.

In the vehicle seat of the present invention, the rear slide rail may be arranged rearward of a wheel housing and the front slide rail may be arranged inner side of the wheel housing.

According to the above constitution, the seat width can be widened, so that the seat sides are adjacent to the interior surfaces of the wheel housings, and the seat can be supported by the wide supporting. Therefore, the seat can be stably supported.

According to the above constitution, the vehicle seat can be slidably supported with respect to the vehicle floor in the front-rear direction.

According to the above constitution, since the rear end of the seat can be supported by the wider rear slide rail, and the front end of the seat can be supported by the narrower front slide rail, the seat can be stably supported.

The vehicle seat of the present invention may further include: a supporting shaft which is provided at the rear end of the seat cushion and supports the seat cushion so as to be rotatable rearward; a supporting member which connects the supporting shaft and the rear end transfer member; and a lock member which unlockably engages the front end of the seat cushion and the front end transfer member.

According to the above constitution, the lock member locks and secures the seat cushion, and the safety of the user is achieved. When the lock member is unlocked, the seat cushion can be rotated rearward by the supporting shaft as the pivot, and the seat cushion can be stored in the storage concave part.

In the vehicle seat of the present invention, the lock member may be constituted to be unlocked when the seat cushion is moved to the furthest front position.

According to the above constitution, the unlocking of the lock member is performed when the seat cushion is moved forward, so that the convenience to the user is achieved. Moreover, unintended unlocking is avoided, so that the safety of the user is achieved.

The vehicle seat of the present invention may further include a seat back which can be laid on the seat cushion, wherein the lock member is constituted to be unlocked when the seat cushion is moved to a furthest front position and also when the seat back is laid on the seat cushion.

According to the above constitution, the unlocking of the lock member is performed when the seat cushion is moved forward, so that the convenience to the user is achieved. Moreover, unintended unlocking is avoided, so that the safety of the user is achieved.

The vehicle seat of the present invention may further include: a supporting shaft which is provided at the rear end of the seat cushion; an extension part which extends outwards from the supporting shaft in a width direction of the seat cushion; and a supporting member which extends rearward from the extension part along the rear end transfer member, wherein the supporting shaft supports the seat cushion so that the seat cushion is rotatable rearward, and wherein the supporting member connects the extension part and the rear end transfer member.

According to the present invention, since the seat can be moved forward so that the rear end of the seat is positioned further to the front of the storage concave part, there is an advantageous effect in that sufficient rear space can be used for general storage purposes, when the seat is not stored.

DETAILED DESCRIPTION OF THE INVENTION

An embodiment of the present invention is explained below with reference to the figures.

Figure 1:
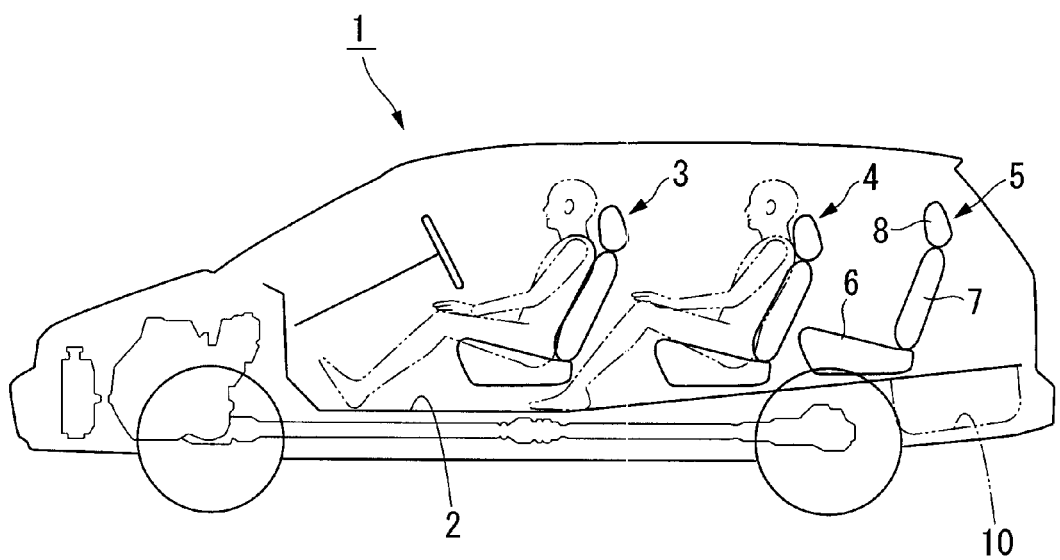
FIG. 1 is a side view showing a schematic structure of the vehicle in one embodiment of the present invention.

As shown in FIG. 1, in the vehicle cabin of a vehicle 1, three rows of seats are provided on a floor 2, from front to rear of the vehicle: a front seat 3, a first rear seat 4, and a second rear seat 5.

Figure 2:
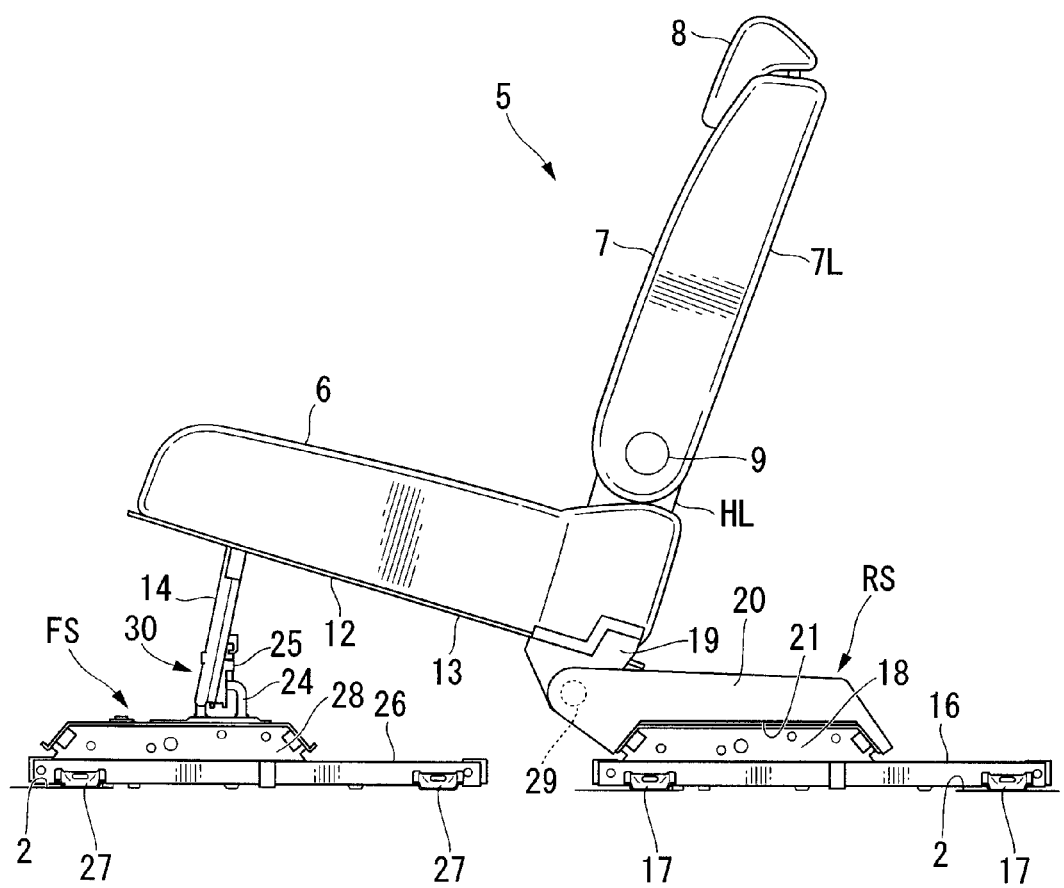
FIG. 2 is a partially enlarged view of the FIG. 1, showing the first embodiment of the present invention.
Figure 3:
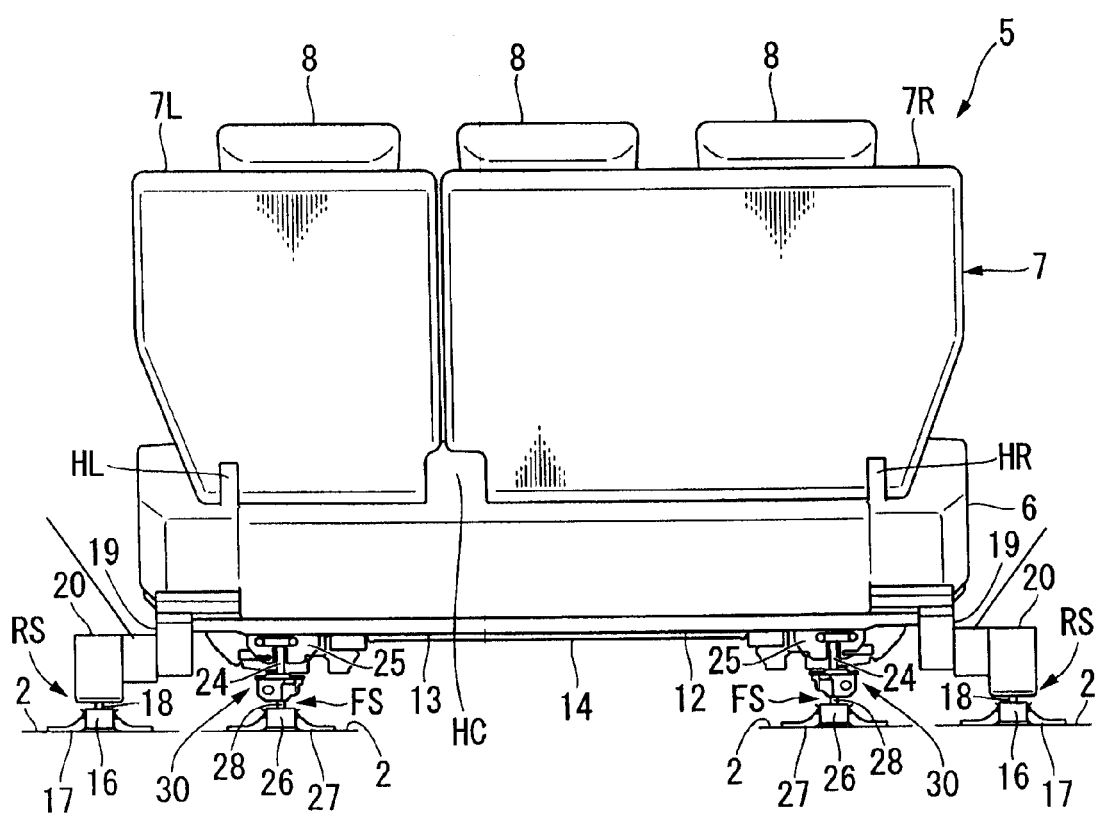
FIG. 3 is a rear view of the FIG. 2.
Figure 4:
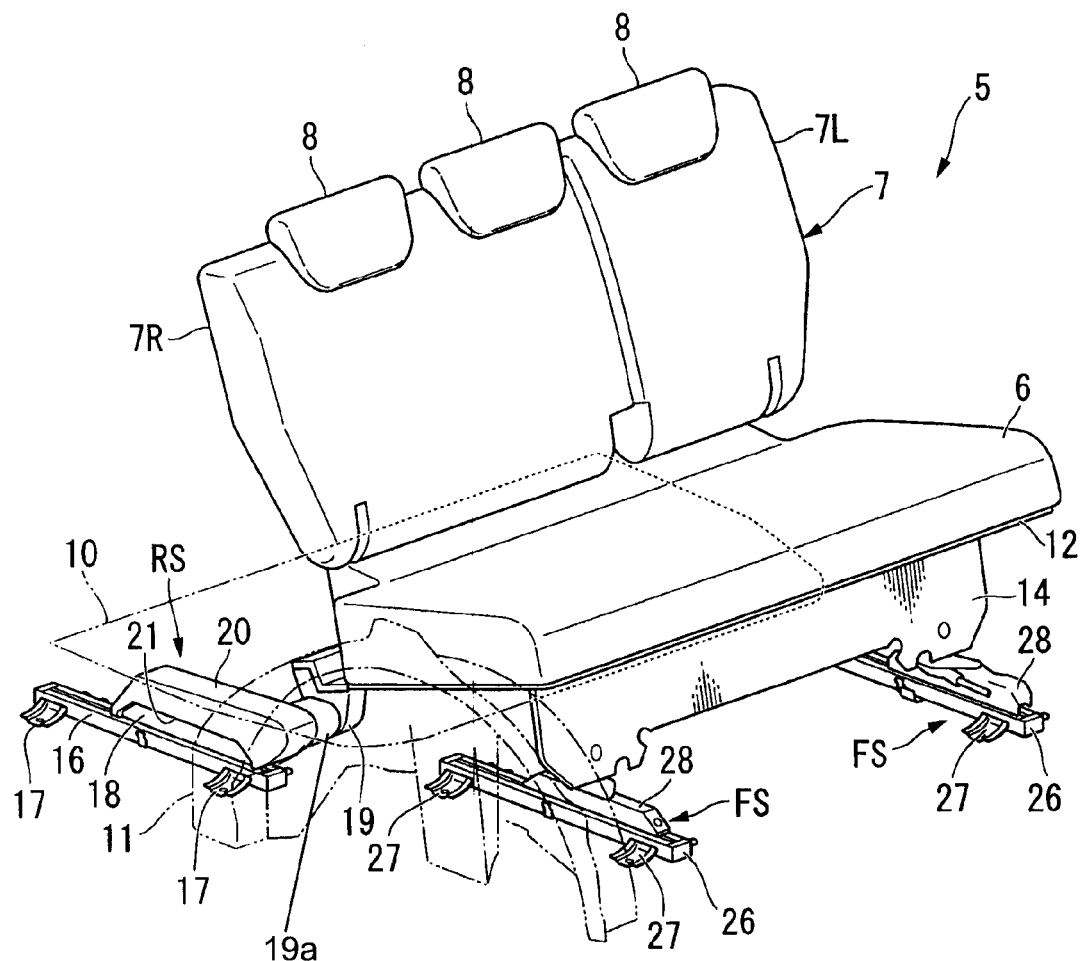
FIG. 4 is a perspective view from a front-right position showing the first embodiment of the present invention.
Figure 5:
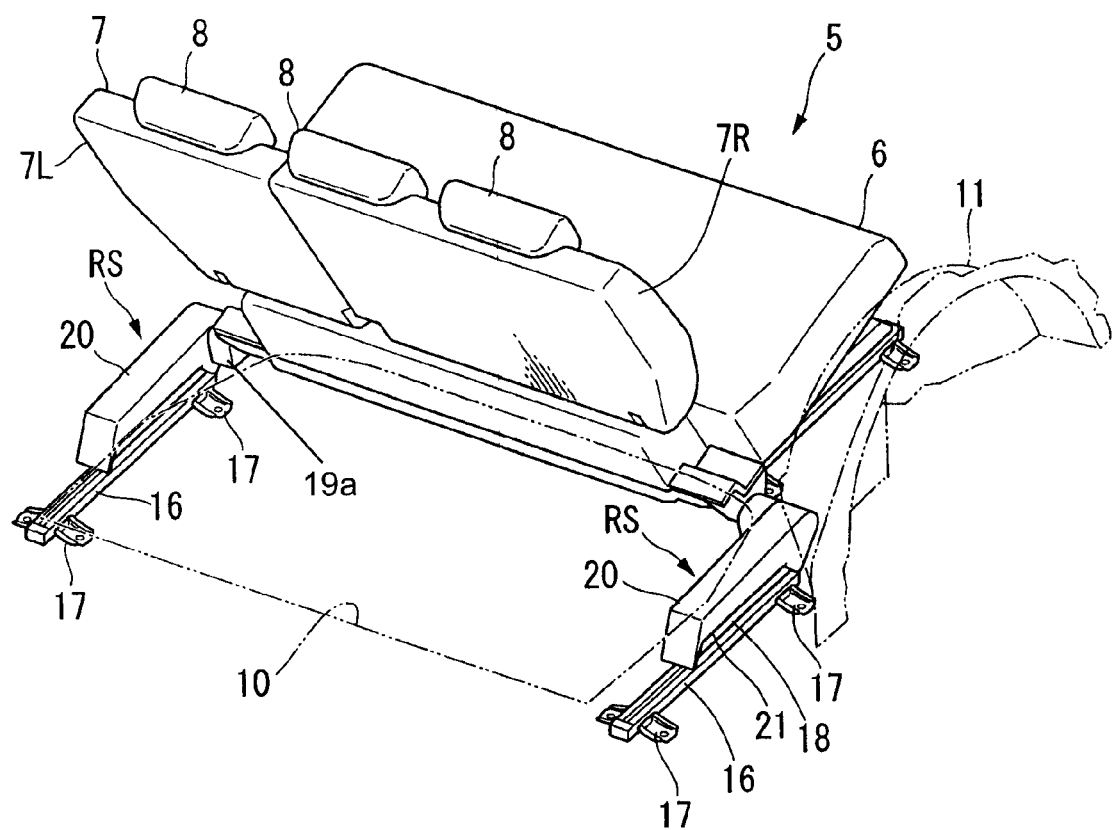
FIG. 5 is a perspective view from a rear-right-above position showing the first embodiment of the present invention.
Figure 6:
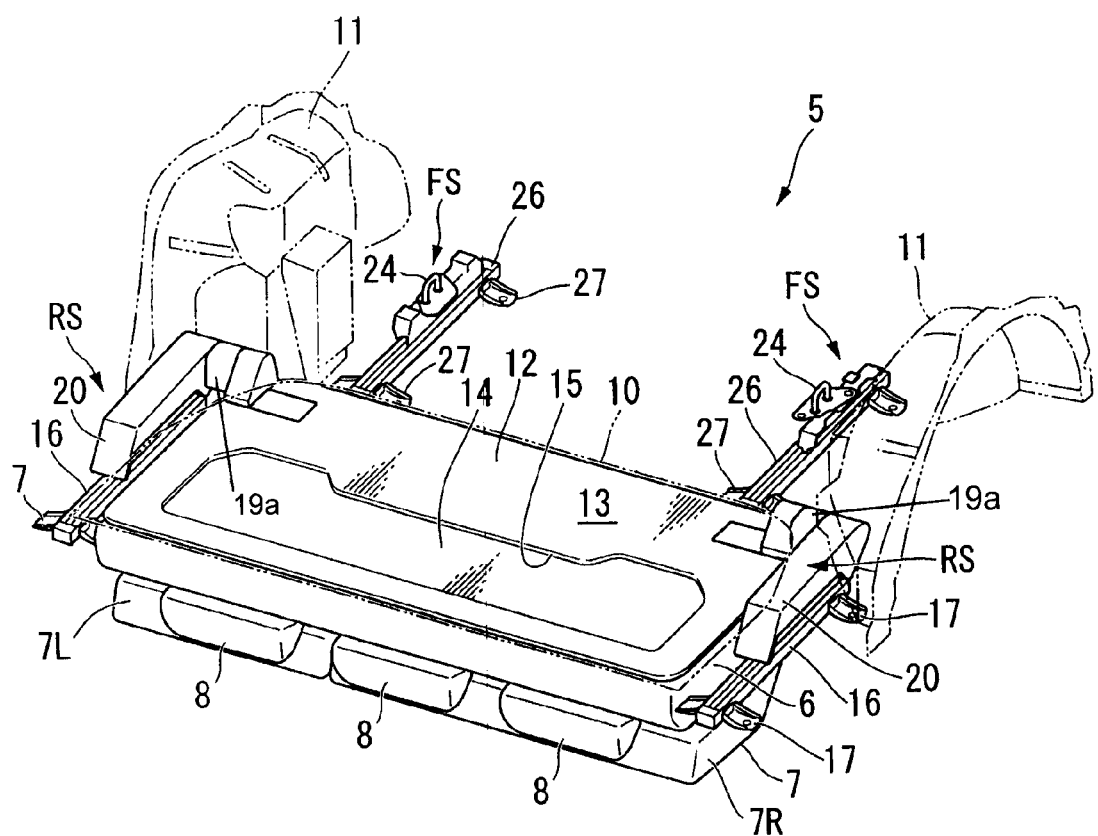
FIG. 6 is a perspective view from right-rear-above position showing the stored state of the first embodiment of the present invention.
Figure 7:
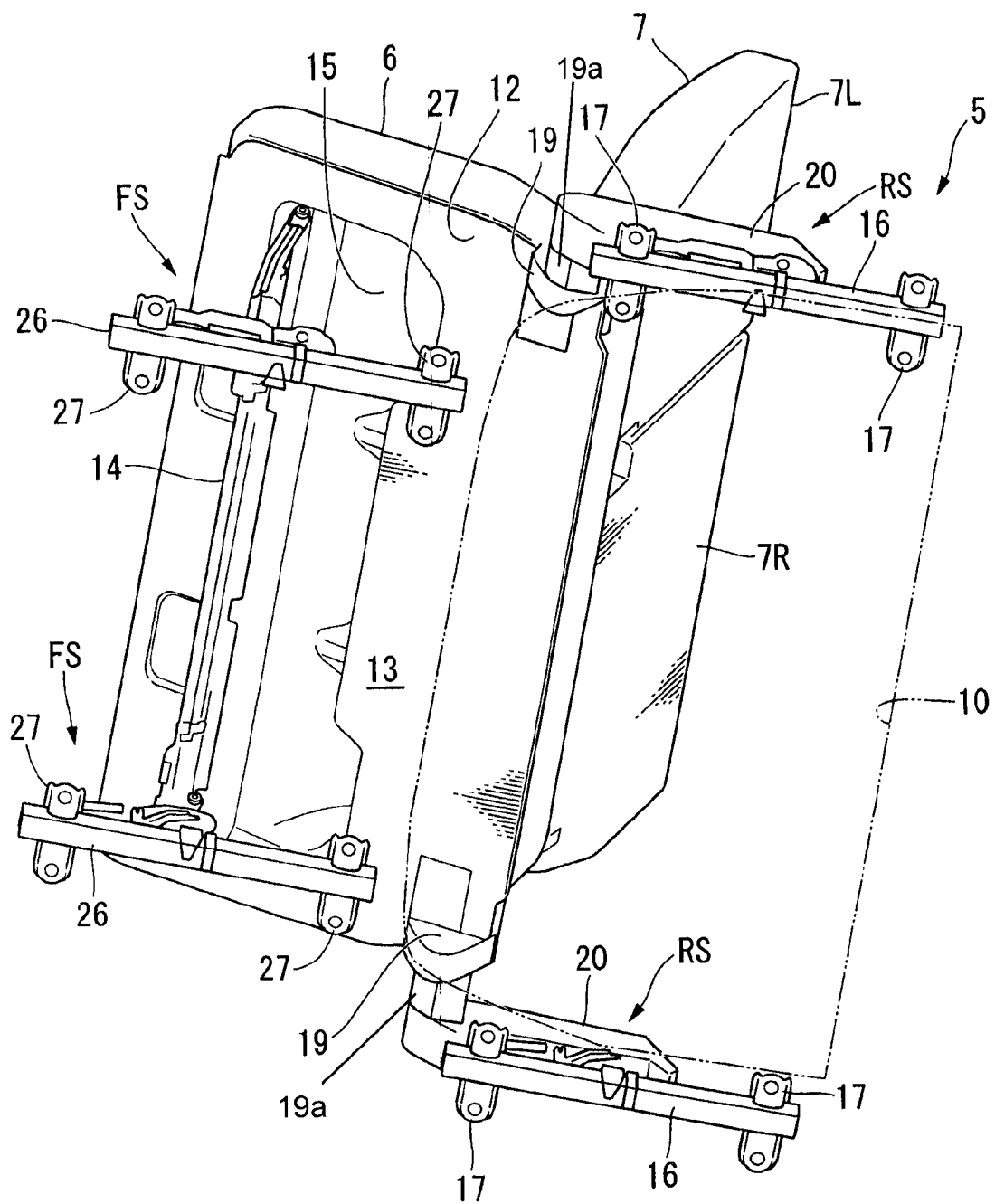
FIG. 7 is a perspective view from a below angle showing the first embodiment of the present invention.
Figure 3:
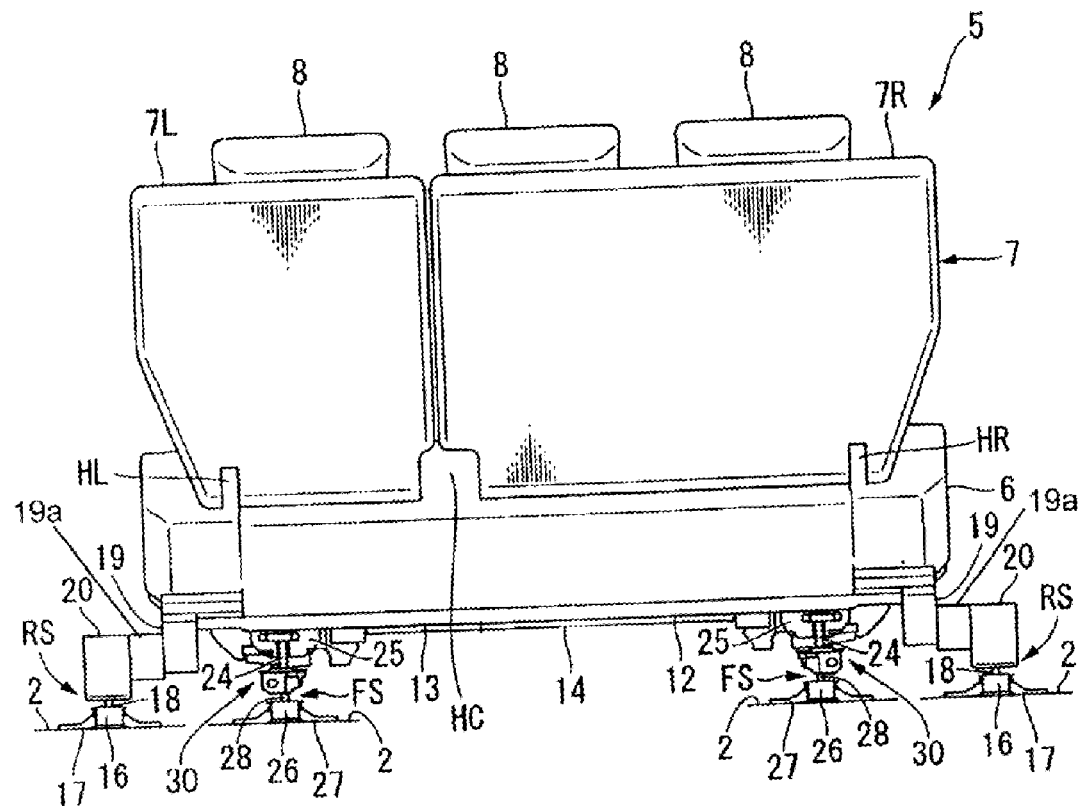

As shown in FIG. 2 to FIG. 4, the second rear seat 5 is a bench-type seat with a capacity of three passengers. The second rear seat 5 includes a seat cushion 6, a seat back 7, and three headrests 8, which are provided at the upper part of the seat back 7 and constituted at positions corresponding to each of the three passengers seating positions.

The seat back 7 is foldable, by a shaft 9 as the pivot, by a reclining mechanism (not shown), toward the seat cushion 6 side, to be laid on the seat cushion 6. A storage concave part 10 is provided in the floor 2 further to the back than the second rear seat 5, to store the second rear seat 5 which is folded from the seating state to the storage state.

The second rear seat 5 is supported slidably with respect to the floor 2 in the front-rear direction, by a front slide rail FS and a rear slide rail RS, which are provided at the both sides of the second rear seat 5.

These front slide rails FS and rear slide rails RS are constituted separately. The front slide rails FS are provided closer to the center than rear wheel housings 11. The rear slide rails RS are provided further to the back than rear wheel housings 11, and further out in the width direction of the vehicle than the front slide rails FS.

The boundary of the storage concave part 10 is shaped to fit the outer boundary shape of the second rear seat 5 in the state wherein the seat back 7 is laid upon the seat cushion 6, and the second rear seat 5 is flipped vertically. The depth of the storage concave part 10 is configured to match the combined thickness of the seat cushion 6 and seat back 7 of the second rear seat 5 in the folded state. In the storage state, a bottom surface 13 of a cushion frame 12 of the seat cushion 6 is constituted to be flush with the floor 2.

When the second rear seat 5 is positioned at the front stroke-end of the sliding movement on the front slide rails FS and rear slide rails RS, the storage concave part 10 is exposed on the floor 2 further to the back of the second rear seat 5. The seat back 7 is divided into a left seat back part 7L, corresponding to a single passenger seated on the left side, and a right seat back part 7R, corresponding to two passengers seated on the right side. The left seat back part 7L and the right seat back part 7R can be separately tilted by the left, right and center hinges, HL, HR, and HC.

The cushion frame 12 is provided at the bottom of the seat cushion 6 of the second rear seat 5. At the bottom surface 13 of the front side of the cushion frame 12, a tabular stay 14 is rotatably provided. The stay 14 supports the front side of the second rear seat 5 along the entire width of the second rear seat 5. The stay 14 is constituted to be rotatable backwards, so that it can be stored in a storage part 15 of the bottom surface 13 of the cushion frame 12, to become flush with the bottom surface 13.

At the left and right side to the storage concave part 10 in the floor 2, further to the back of the rear wheel housing 11, adjacent to the interior surface of the vehicle cabin, rear-lower rails 16 are provided. The rear-lower rails 16 are secured by front and rear part with brackets 17, along the front-rear direction of the vehicle.

A rear-upper rail 18 is supported by the rear-lower rail 16 so as to be slidable in the front-rear direction.

On the other hand, a rear end bracket 19 is provided at the rear end part of the seat cushion 6. This rear end bracket 19 supports the front end part of a supporting member 20 which extends rearward. This supporting member 20 is fixed on the rear-upper rail 18.

On the rear end bracket 19, a rotation shaft 29, which extends in the vehicle width direction (as shown in FIG. 2), is provided. An extension part 19A joins the rear end bracket 19 to the support member 20. The seat cushion 6 is constituted to be rotatable backwards, by the rotation shaft 29 as the pivot.

The supporting member 20, which extends backwards, projects sideways from the side surface of the seat cushion 6. At the bottom face of the supporting member 20, a concave portion 21 is constituted, which covers the rear-upper rail 18 from the top. While the supporting member 20 is supported on the rear end bracket 19, when the rear-upper rail 18 is located at the front-end part of the slide stroke on the rear-lower rail 16 (the position shown in the FIG. 2), a lock system (not shown) is unlocked, and the rear end bracket 19 becomes rotatable backwards, by the rotation shaft 29 as the pivot. The rotation shaft 29 is provided at the front-end part of the supporting member 20 and extends along the vehicle width direction.

The rear-upper rail 18 and the rear-lower rail 16 constitute the rear slide rail RS. This rear slide rail RS constitutes the rear end transfer member, which moves the rear-end part of the seat cushion 6 in the vehicle front-rear direction.

Accordingly, the supporting member 20 connects the rear end part of the seat cushion 6 and the rear slide rail RS (the rear end transfer member).

On the floor 2 in front of the storage concave part 10, front-lower rails 26 are fixed. The front-lower rails 26 are provided along the vehicle front-rear direction, in parallel to the rear-lower rails 16, and closer to the center in the vehicle width direction, than the rear-lower rails 16.

The front-lower rails 26 are supported at its front and rear part by brackets 27. On this front-lower rail 26, the front-upper rail 28 is supported slidably in the front-rear direction. A striker 24 is fixed on the front-upper rail 28. The striker 24 has a U-shape when seen from the side.

At the rotating end of the stay 14 which is provided on the cushion frame 12, more specifically, on the back side (reverse side) of the stay 14, latches 25 are provided. Each of the latches 25 is anchored on the striker 24 of each front-upper rail 28. The striker 24 and the latch 25 constitutes a lock member 30 which unlockably engages the front end of the seat cushion and the front end transfer member.

When the stay 14 rotates in the front direction and is suspended, the latches 25 of the stay 14 can be anchored on the strikers 24 of the front-upper rails 28, and the second rear seat 5 becomes seatable.

The front-upper rail 28 and the front-lower rail 26 constitute the front slide rail FS. This front slide rail FS constitutes a front end transfer member, which moves the front end part of the seat cushion 6 in the front-rear direction of the vehicle. Accordingly, the front slide rails FS are located closer to the center in the width direction of the vehicle, than the rear slide rails RS.

The stay 14 is normally engaged and connected with the front-upper rail 28 by the latch 25 and the striker 24. At this state the stay 14 is slidable on the front-lower rail 26. When the front-upper rail 28 slides forward and the front-upper rail 28 is positioned at the front end of the front-lower rail 26 (the position shown in the FIG. 2), i.e., when the seat cushion 6 is moved to the furthest front position, by the unlocking function of the lock member 30, the engagement of the latch 25 and the striker 24 becomes releasable. At the above described state of the seat, the rear-upper rail 18 is located at the front end part of the rear-lower rail 16. Therefore, the rear end bracket 19 is set to be rotatable in relation to the supporting member 20. Accordingly, the seat cushion 6, since the restriction at the front end thereof is unlocked, can rotate toward the rear direction.

The requirement for the seat cushion 6 to become rotatable may include more than the location of the seat cushion 6 at the front end part of the sliding stroke, as described above. The requirement may also include the rotation of the seat back 7 until it is laid on the seat cushion 6. In this constitution, when both requirements are fulfilled, does the engagement of the latch 25 of the stay 14 and the striker 24 of the front-upper rail 28 become unlocked.

By the function of the above constitution, the seat cushion 6 remains locked unless it is moved to the front end part of the sliding stroke, and the safety of the user is achieved. The unlocking of the lock member 30 is performed when the seat cushion is moved forward, so that the convenience to the user is achieved. Moreover, unintended unlocking is avoided, so that the safety of the user is achieved.

According to the above embodiment, when the second rear seat 5 is to be stored in the storage concave part 10, the second rear seat 5 must be moved forward to the end of the sliding stroke along the rear-lower rail 16 and the front-lower rail 26. At this stage, the storage concave part 10 is exposed further to the back of the second rear seat 5. At this state, the engagement between the latches 25 at the distal end of the stay 14 and the strikers 24 of the front-upper rail 28 becomes unlocked. Simultaneously, at the rear end part of the seat cushion 6, the locking state of the rear end bracket 19 and the supporting member 20 becomes unlocked, and the rear end bracket 19 becomes rotatable rearward in relation to the supporting member 20.

As the seat cushion 6 is rotated backwards by the rotation shaft 29 as the pivot, in conjunction with the seat back 7 laid over the seat cushion 6, the rear end bracket 19 also rotates by the rotation shaft 29 as the pivot relative to the supporting member 20. Accordingly, the second rear seat 5 rotates and the second rear seat 5 becomes stored in the storage concave part 10.

At this stage, the stay 14 becomes stored in the storage part 15 of the cushion frame 12 and becomes flush with the storage part 15, so that it does not affect the flatness of the bottom surface 13 of the cushion frame 12.

Since the front slide rail FS and rear slide rail RS can be provided separately while avoiding the storage concave part 10 and the rear wheel housing 11, the width of the second rear seat 5 can be constituted so that the sides of the second rear seat 5 are adjacent to the rear wheel housings 11. Accordingly, the width of the second rear seat 5 can be constituted wide.

By providing the supporting member 20 which connects the rear end of the seat cushion 6 and the rear slide rail RS, the rear end of the second rear seat 5 can be positioned further to the front of the storage concave part 10, when the second rear seat 5 is moved to the far front of the sliding stroke.

Therefore, when the second rear seat 5 is not in the storing position, a substantial storage space is ensured at the back of the second rear seat 5.

Since the rear slide rail RS is provided further to the back of the rear wheel housing 11 on the floor 2 of the vehicle 1, the width of the second rear seat 5 can be constituted so that the sides of the second rear seat 5 are adjacent to the rear wheel housings 11. Since the second rear seat 5 can be supported by the wide supports provided to the back of the rear wheel housing 11, the second rear seat 5 can be stably supported.

Since the left and right front slide rails FS are provided closer to the center in the width direction of the vehicle than the rear slide rails RS, the rear end of the second rear seat 5 can be supported by the wide rear slide rails RS, and the front end of the second rear seat 5 can be supported by the narrower front slide rails FS. Accordingly, the second rear seat 5 can be stably supported.

It should be understood that specific configurations of the present invention are not limited to the above-described embodiments. While the constitution wherein the seat is supported continuously slidably on the floor has been described above, the present invention can be applied to other constitutions including those wherein the seat is secured arbitrarily at a plurality of predetermined positions. The rear-lower rail 16 may be provided on the internal side surface of the vehicle. Although in the above-described constitution, the seats are provided in three rows, the present invention may also be applied in a vehicle wherein the seats are not provided in three rows tandemly along the front-rear direction of the vehicle.

What is claimed is:

1. A vehicle seat comprising:
a seat cushion;
a front end transfer member which supports a front end of the seat cushion movably in a front-rear direction of a vehicle; and
a rear end transfer member which supports a rear end of the seat cushion movably in a front-rear direction of the vehicle, wherein the seat cushion is storable in a storage concave part provided in a vehicle floor further to a rear than the seat cushion, and the entire front end transfer member is secured to the vehicle floor in front of the storage concave part, and the rear end transfer member is provided laterally to a side of the storage concave part.

2. The vehicle seat according to claim 1, further comprising:
a supporting member which connects the rear end of the seat cushion and the rear end transfer member.

3. The vehicle seat according to claim 1,
wherein the rear end transfer member is provided on the vehicle floor located behind a wheel housing.

4. The vehicle seat according to claim 1,
wherein the front end transfer member comprises a front slide rail extending in a front-rear direction of the vehicle,
the rear end transfer member comprises a rear slide rail extending in the front-rear direction of the vehicle, and
the front slide rail and the rear slide rail are parallel to each other.

5. The vehicle seat according to claim 4,
wherein the front slide rail is provided closer to a center in a width direction of the vehicle than the rear slide rail.

6. The vehicle seat according to claim 5, wherein the rear slide rail is arranged rearward of a wheel housing and the front slide rail is arranged inner side of the wheel housing.

7. The vehicle seat according to claim 1, further comprising:
a supporting shaft which is provided at the rear end of the seat cushion and supports the seat cushion so as to be rotatable rearward;
a supporting member which connects the supporting shaft and the rear end transfer member; and
a lock member which unlockably engages the front end of the seat cushion and the front end transfer member.

8. The vehicle seat according to claim 7, wherein the lock member is constituted to be unlocked when the seat cushion is moved to a furthest front position.

9. The vehicle seat according to claim 7, further comprises a seat back which can be laid on the seat cushion, wherein the lock member is constituted to be unlocked when the seat cushion is moved to a furthest front position and also when the seat back is laid on the seat cushion.

10. The vehicle seat according to claim 1, further comprising:
a supporting shaft which is provided at the rear end of the seat cushion;
an extension part which extends outwards from the supporting shaft in a width direction of the seat cushion; and
a supporting member which extends rearward from the extension part along the rear end transfer member,
wherein the supporting shaft supports the seat cushion so that the seat cushion is rotatable rearward, and
the supporting member connects the extension part and the rear end transfer member.

* * * * *

UNITED STATES PATENT AND TRADEMARK OFFICE
CERTIFICATE OF CORRECTION

PATENT NO.       : 7,431,372 B2                                    Page 1 of 2
APPLICATION NO.  : 11/939898
DATED            : October 7, 2008
INVENTOR(S)      : Masahiro Imamura et al.

It is certified that error appears in the above-identified patent and that said Letters Patent is hereby corrected as shown below:

In the drawings delete drawing sheet 3 and replace with attached replacement sheet.

Signed and Sealed this

Sixteenth Day of December, 2008

JON W. DUDAS
*Director of the United States Patent and Trademark Office*